United States Patent [19]
McFarland

[11] Patent Number: 5,834,654
[45] Date of Patent: Nov. 10, 1998

[54] TORQUE AND TEMPERATURE CONTROL FOR A WATER BRAKE DYNAMOMETER

[76] Inventor: Robert A. McFarland, P.O. Box 3315, Ventura, Calif. 93006

[21] Appl. No.: 613,490

[22] Filed: Mar. 11, 1996

[51] Int. Cl.$^6$ ........................................... G01L 3/20
[52] U.S. Cl. ........................................... 73/862.14
[58] Field of Search ..................... 73/862.14, 862.08, 73/862.09, 862.191

[56] References Cited

U.S. PATENT DOCUMENTS

| | | | |
|---|---|---|---|
| 3,598,208 | 8/1971 | Bronder | 73/862.14 |
| 4,215,569 | 8/1980 | Bonomo et al. | 73/862.14 |
| 4,744,724 | 5/1988 | Brassert et al. | 73/862.14 X |
| 5,396,811 | 3/1995 | Quartarone | 73/862.14 |
| 5,474,154 | 12/1995 | Coale | 116/274 X |
| 5,571,975 | 11/1996 | Smith, Jr. et al. | 73/862.14 X |

FOREIGN PATENT DOCUMENTS 0053429  5/1984  Japan.

*Primary Examiner*—Elizabeth L. Dougherty
*Attorney, Agent, or Firm*—Jack C. Munro

[57] ABSTRACT

Simultaneously opening and closing the inlet and outlet valves of a water brake dynamometer to increase or decrease the flow of water through the dynamometer. By so controlling the flow of water through the dynamometer, the power absorbed by the water within the dynamometer is controlled as well as the outlet temperature.

25 Claims, 5 Drawing Sheets

TORQUE AND TEMPERATURE CONTROL FOR A WATER BRAKE DYNAMOMETER

BACKGROUND OF THE INVENTION

1) Field of the Invention

The field of this invention relates to dynamometers and more particularly an apparatus controlling torque and outlet water temperature on a water brake dynamometer.

2) Description of the Prior Art

A dynamometer is an instrument for measuring power, force or energy, such a the horsepower developed by an internal combustion engine or electric motor, or the current voltage or power in an electric circuit. There are many different types of dynamometers, both electrical and mechanical. One type of dynamometer is what is called a water brake. It consists of a rotor, driven by the engine or machine being tested, with this rotor being fitted inside of a water-filled casing (defined as a stator) that is free to rotate a limited distance. The rotor forces the water against the casing, and thus the torque is transmitted through the water to the casing. By measuring the effort needed to prevent the casing from rotating, the output torque, and thus the horsepower, can be determined. The power is dissipated by the heating and circulation of the water.

The amount of momentum transferred at a given revolutions per minute (RPM) is a function of the mass of water that is accelerated from near the center of the dynamometer rotor to the tangential velocity of the rotor tip per unit time. The factors determining this torque at a particular RPM are the rotor diameter (which determines tangential velocity), the efficiency of the transfer of the tangential velocity water from the rotor to the stator and then the stator converting the tangential water velocity to axial water velocity, and the percentage of water capacity inside the dynamometer at that moment.

The majority of the water inside a water brake dynamometer is recirculated back from the stator to the rotor. Water is transferred from the rotor tangentially, generally near the circumference of the rotor, with the water being received by the stator and its direction being changed so that it is recirculated back to the rotor in an axial direction generally near the center of the rotor. The process of momentum transfer from the rotor to the stator generates heat in the water.

There must be a water flow through the dynamometer sufficient to remove the heat generated or the water will eventually flash to steam. The flow required is calculable from the horsepower being absorbed and the desired outlet water temperature or desired temperature rise above the inlet water temperature by the following formula:

$$GPM = \frac{5.09 \times P}{\nabla T}$$

where GPM=U.S. gallons per minute, P=Horsepower being absorbed by the water, and $\nabla T$=water outlet temperature minus inlet temperature in °F.

Outlet temperature control is not critical, but a general guideline of 140° F. maximum will reduce lime deposits within the dynamometer, 160° F. is permitted for short durations and 180° F. is the absolute maximum for very short durations. Excessive mineral deposits will result from sustained operation in the 160°–180° F. range. Generally most dynamometer installations produce acceptable outlet temperatures (140°–160° F.) when the water flow is adjusted for a 50°–70° F. rise above the inlet water temperature.

Dynamometer fill and load is controlled by the difference between the inlet and outlet flow of the water. Dynamometer outlet water temperature is controlled by the flow rate of water through the dynamometer. To increase load, the inlet flow must be increased versus the outlet flow so that the level of the dynamometer fill increases and vice versa to decrease the load. To increase heat dissipation (lower the outlet water temperature) without affecting load, the inlet and outlet flow must be increased by the same amount and vice versa to decrease heat dissipation (raise the outlet water temperature). If only an inlet or outlet valve is used, then only dynamometer load can be controlled and simultaneous outlet temperature control is not possible. Most dynamometers use a single load control valve and maximum outlet temperature is set by an adjustable inlet pressure regulator or manually adjusted inlet flow restrictor.

Load torque in a water brake dynamometer that has only the rotor as a moving part is a function of the water level inside the dynamometer at a given speed. The fastest way of filling or emptying (usually called "dumping") the water inside the dynamometer in order to achieve a desired water level will result in the most rapid method of achieving the desired load torque.

One way that dynamometers are classified is by the method such use to change the load torque, typical classification being inlet valve controlled or outlet valve controlled. This means that an inlet or outlet control valve is used to control the load torque. This is accomplished by that particular valve increasing or decreasing flow into or out of the dynamometer which changes the percentage of filling of water inside the dynamometer.

Inlet valve controlled dynamometers have a restriction which may be a fixed orifice or a manually adjustable valve, with this restriction being located in the outlet. The difference in flow rate between the inlet and outlet determines the level of water inside the dynamometer. These types of dynamometers tend to be relatively slow loading and unloading which makes them relatively easy to control with a manually adjusted inlet valve, but not particularly suitable for fast dynamic control applications.

Outlet valve controlled dynamometers have a restriction in the inlet which usually is an inlet pressure regulator or manually adjustable valve. Like the inlet controlled dynamometer, the difference in flow rate between the inlet and the outlet determines the level of water inside the dynamometer. These types of dynamometers tend to be faster than inlet controlled dynamometers during both loading and unloading primarily due to the ability to completely shut off outlet flow to increase the level of water inside the dynamometer and completely open up the outlet to rapidly dump the water from inside the dynamometer. The speed of response of these dynamometers makes electronic control of the outlet valve almost mandatory which usually makes it more expensive, but these dynamometers are also suitable for dynamic testing requirements. The inlet must be restricted so that the outlet valve can dump faster than the inlet can fill or the dynamometer will not unload.

Prior art dynamometers, which have utilized inlet and outlet valves, have not used both inlet and outlet valves dynamically to control load and have not tried to eliminate or reduce inlet and outlet restrictions in order to maximize dynamometer filling and dumping rates. For example, a system sometimes used by Froude includes a slow acting inlet control valve as variable restrictor. This Froude system is to slowly adjust the inlet restrictor valve until the fast-acting outlet control valve is centered. There is also a second technique, sometimes used by Schenck, which uses a slow-acting inlet flow control valve controlled by dynamometer back pressure and a fast-acting outlet load control valve. The dynamometer back pressure is proportional to horsepower. A still further technique, referred to as the Clayton technique, use small solenoid valves at the inlet and outlet to increase or decrease the load torque in the water brake dynamometer. However, these small solenoid valves are major flow restrictors into and out of the dynamometer. This is intentional because the Clayton dynamometer is designed for manual load adjustment and rapid dynamic changes in the fill level of the dynamometer are not desirable or possible given the type and size of the valves used.

In summary, all prior art known dual valve techniques for dynamometers use only one valve to dynamically control load and the other valve to attempt outlet water temperature control (such as a Schenck technique), to linearize the dynamometer or control valve characteristic (such as a Froude technique), or for the non-dynamic (in other words slow) manual load control.

SUMMARY OF THE INVENTION

A water brake dynamometer that has a water inlet and a water outlet. Mounted within the water inlet is an inlet flow control device and mounted within the water outlet is an outlet flow control device. Both control devices are movable in order to set the volume of flow through the water inlet and through the water outlet with the setting of each device being independent of each other. Both devices are to be movable by means of a controller with this controller normally being electrical. This controller is to cause simultaneous changes in the flow within both the water inlet and the water outlet. These changes can be increases or decreases. The flow through the water brake dynamometer is determined by a position setpoint and a position offset with the setpoint and offset being added together to determine the position of the flow control device. The position setpoint is to be varied to regulate the level of water inside the dynamometer according to the desired torque to be absorbed by the dynamometer. The position offset is to be varied to regulate the flow through the dynamometer according to the temperature within the dynamometer, the back pressure of the dynamometer or due to the power absorbed by the dynamometer.

The primary objective of the present invention is to use two flow control devices, one within the water inlet and one within the water outlet of a water brake dynamometer to control outlet water temperature of the dynamometer.

Another objective of the present invention is to eliminate restrictors within the water inlet and the water outlet in order to maximize the water filling and dumping for a water brake dynamometer.

Another objective of the present invention is to simultaneously control both the dynamometer load and outlet water temperature by utilizing fast acting flow control devices at both the water inlet and water outlet of the dynamometer.

DETAILED DESCRIPTION OF THE SHOWN EMBODIMENTS

Figure 1:
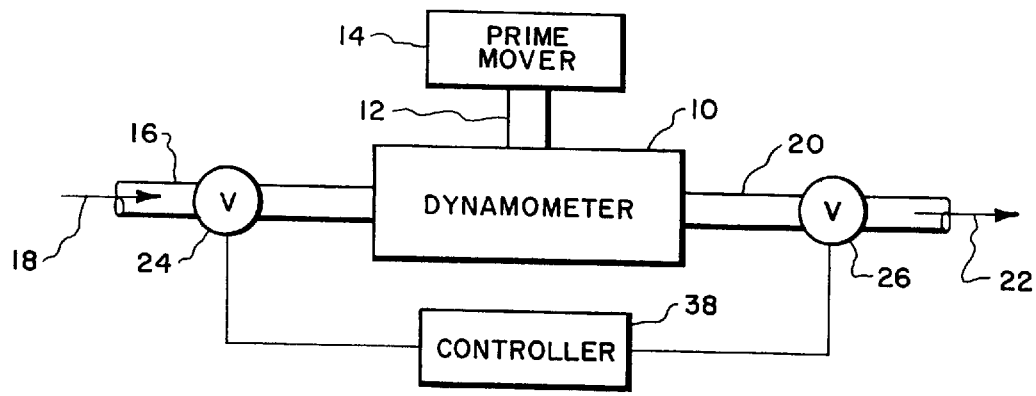
FIG. 1 is a block diagram of a typical water brake dynamometer installation showing flow control devices, typically valves, that are placed in conjunction with the water inlet and the water outlet which are controlled by means of a controller.

FIG. 1 depicts a water brake dynamometer 10 which has an output shaft 12. The output shaft 12 is to be connected to load 14. The load 14 can comprise any conventional type of load such as an engine. Water is to be supplied into the dynamometer 10 through the water inlet pipe 16 in the direction of arrow 18. Water is to be discharged from the dynamometer 10 through a water outlet pipe 20 in direction of arrow 22. Normally the water outlet pipe 20 will redirect the outlet water back to the water inlet pipe 16. However, there is usually utilized a reservoir from which the water is extracted into the water inlet pipe 16 and into which water from the water outlet pipe 20 is discharged.

Figure 2:
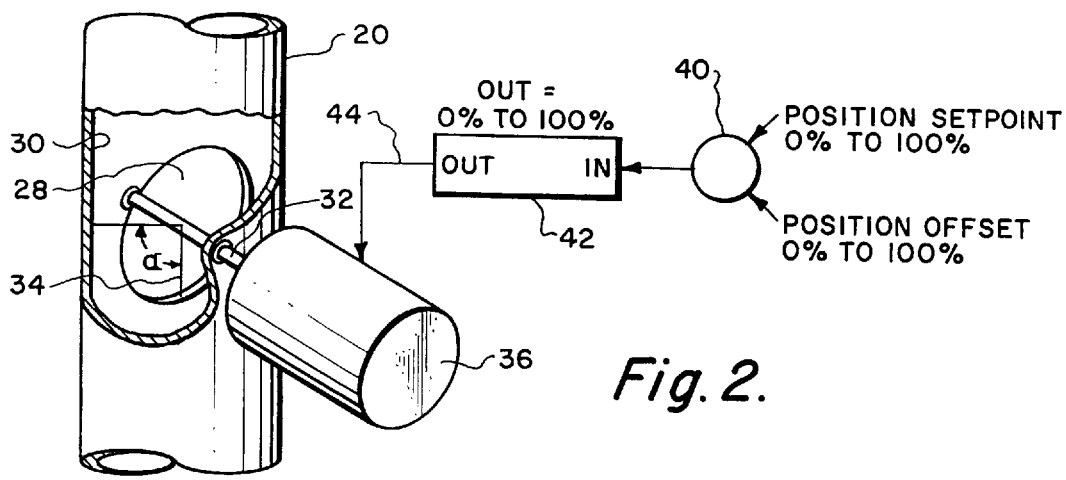
FIG. 2 is a schematic view of a type of valve that could be utilized within FIG. 1 within either or both of the water inlet or outlet depicting the inputs to the controller to affect the movement of the valve.

Mounted within the water inlet pipe 16 is a flow control device, typically a water inlet valve 24. Mounted within the water outlet pipe 20 is a flow control device, typically a water outlet valve 26. Normally, the valves 24 and 26 are identical. A typical construction for the valves 24 and 26 is shown in FIG. 2 where there is shown the water outlet pipe 20 with a butterfly valve plate 28 being mounted across the interior chamber 30 of the water outlet pipe 20. The butterfly valve plate 28 is fixedly mounted on a shaft 32 which is rotationally mounted in a watertight manner within the wall of the water outlet pipe 20 with the shaft 32 passing through the longitudinal center axis 34 of the interior chamber 30. This butterfly valve plate 28 could be rotationally positioned directly transverse to the interior chamber 30 which would prevent flow of water (0% open) through the water outlet pipe 20. The butterfly valve plate 28 could also be rotationally positioned to be aligned with the direction of flow of water through the interior chamber 30 which would then be in the position of 100% flow of water through the water outlet pipe 20. The butterfly valve plate 28 can be pivoted to any position between the closed (0%) position and the totally open (100%) position. The angular representation of the butterfly valve plate 28 is referred to as angle α. The shaft 32 is rotated by means of a motor which is defined as a valve positioner 36. There will be a separate valve positioner 36 connected to water inlet valve 24 and to water outlet valve 26. The valve positioner 36 is to be operatively driven by a controller 38. Typically, the controller 38 will comprise electronics. However, it is possible that the controller 38 could be mechanical. Although valves 24 and 26 are discussed as being used, other flow control devices such as pumps could be used.

The butterfly valve plate 28 is shown as a typical rotary valve. The valve position is a function of the rotational angle of the shaft 32 from the fully closed position. If the valve utilized was a linear actuation valve, such as a needle valve or a gate valve, the valve position would be a function of the linear stroke of the shaft of the valve from the fully closed position to the fully open position.

The butterfly valve plate 28 is shown approximately 67% in the open position FIG. 2 also shows that the valve position setpoint, scaled from 0% to 100%, may be added to a valve position offset also scaled from 0% to 100%. The position setpoint and position offset are to be added within a summing junction 40. Typically, the summing junction 40 will comprise an electronic summing junction which adds voltages. The output of the summing junction 40 is transmitted through a limiter 42. The purpose of the limiter 42 is to not let its output within line 44 exceed 100%. The position setpoint is to initially establish the limits of the closed position and the open position of the butterfly valve plate 28, in other words angle α. By way of example, the position offset could be set at 0% to 100% with 0% being totally closed not transmitting any flow of water through the water outlet valve 26 and 100% permitting maximum flow of water through the water outlet valve 26. In the 100% position, the angle a would be ninety degrees. In the 0% position, the angle a would be zero degrees. However, if the position offset was, for example, ten degrees, because this position offset is added to the position setpoint, the butterfly valve plate 28 will be partially open at the 10% position even if the position setpoint was 0%. Effectively, the valve position offset provides independent control of the starting angle of the valve positioner 36.

One way to achieve outlet temperature control is to introduce a valve position offset to the water inlet valve 24 and the water outlet valve 26 that is a function of absorbed horsepower since water flow through the dynamometer is a function of the horsepower. For example, if the valves 24 and 26 were both opened by an amount proportional to horsepower, the inlet and outlet flow would be proportional to horsepower simultaneously increased and outlet water temperature would stay the same.

One simple way to accomplish outlet temperature control is a fixed offset in either the water inlet valve 24 or the water outlet valve 26 or both. This fixed offset would be adjusted by operating the dynamometer 10 at maximum power and adjusting the position of the butterfly valve plates 28 for the desired dynamometer outlet water temperature. This technique has no lag like feedback systems might but it also introduces no perturbations in the control system, thus the stability of the system is not affected. It is also possible to calibrate the offset versus horsepower for a particular dynamometer thus making it easy to adjust the offset for different maximum power requirements. A fixed inlet/outlet position offset does not provide continuous water outlet temperature control. But this technique does provide benefits of fast loading and unloading of the dynamometer due to simultaneous inlet and outlet valve control and safe water flow for the highest power requirements in much the same way as prior art practice.

Figure 3:
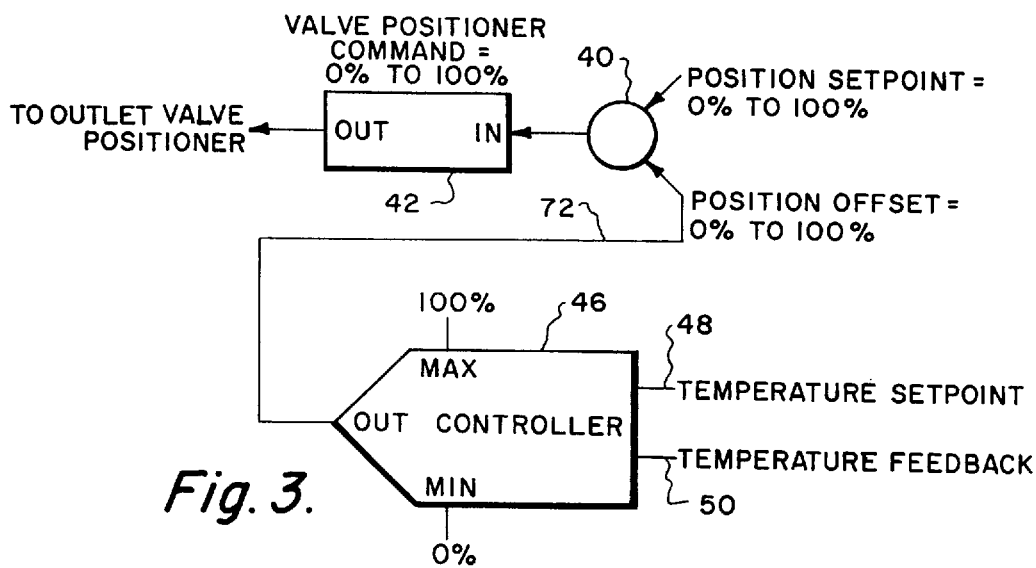
FIG. 3 is a view similar to FIG. 2 but of a modified form of control for the valve which utilizes the water outlet temperature to alter the position of the valve.

A refinement of the fixed offset technique would be to continuously regulate the dynamometer flow as a function of horsepower absorbed. This could be accomplished in several ways. One technique is shown in FIG. 3 which is to regulate the position offset as a function of outlet water temperature within the water outlet pipe 20. Actually, the internal water temperature within the dynamometer 10 would even be better. The water temperature can increase very rapidly inside the dynamometer 10 and flow would need to increase equally rapidly to prevent flash steam generation. This temperature control method shown in FIG. 3 is direct since it controls the primary variable of interest which is the temperature of the outlet water within the water outlet pipe 20. Furthermore, the only incremental cost in implementing this technique is the temperature sensor and some simple electronics. This method will work for any horsepower capacity dynamometer and any water brake dynamometer designed without calibrating the temperature regulator to the full requirements or horsepower capacity of the dynamometer, The position offset, which is the output of the controller 46, is varied according to the setpoint temperature 48 and the feedback temperature 50. For example, if the setpoint temperature was one hundred and sixty degrees Fahrenheit and the feedback temperature, which is the actual temperature within the water outlet pipe 20, was one hundred and seventy degrees, the position offset would be increased thereby increasing the opening of the butterfly valve plate 28 to get an increased flow through the dynamometer 10. It is to be understood that the butterfly valve plate 28 within the water inlet valve 24 would also be open an equally greater amount.

Figures 4, 5:
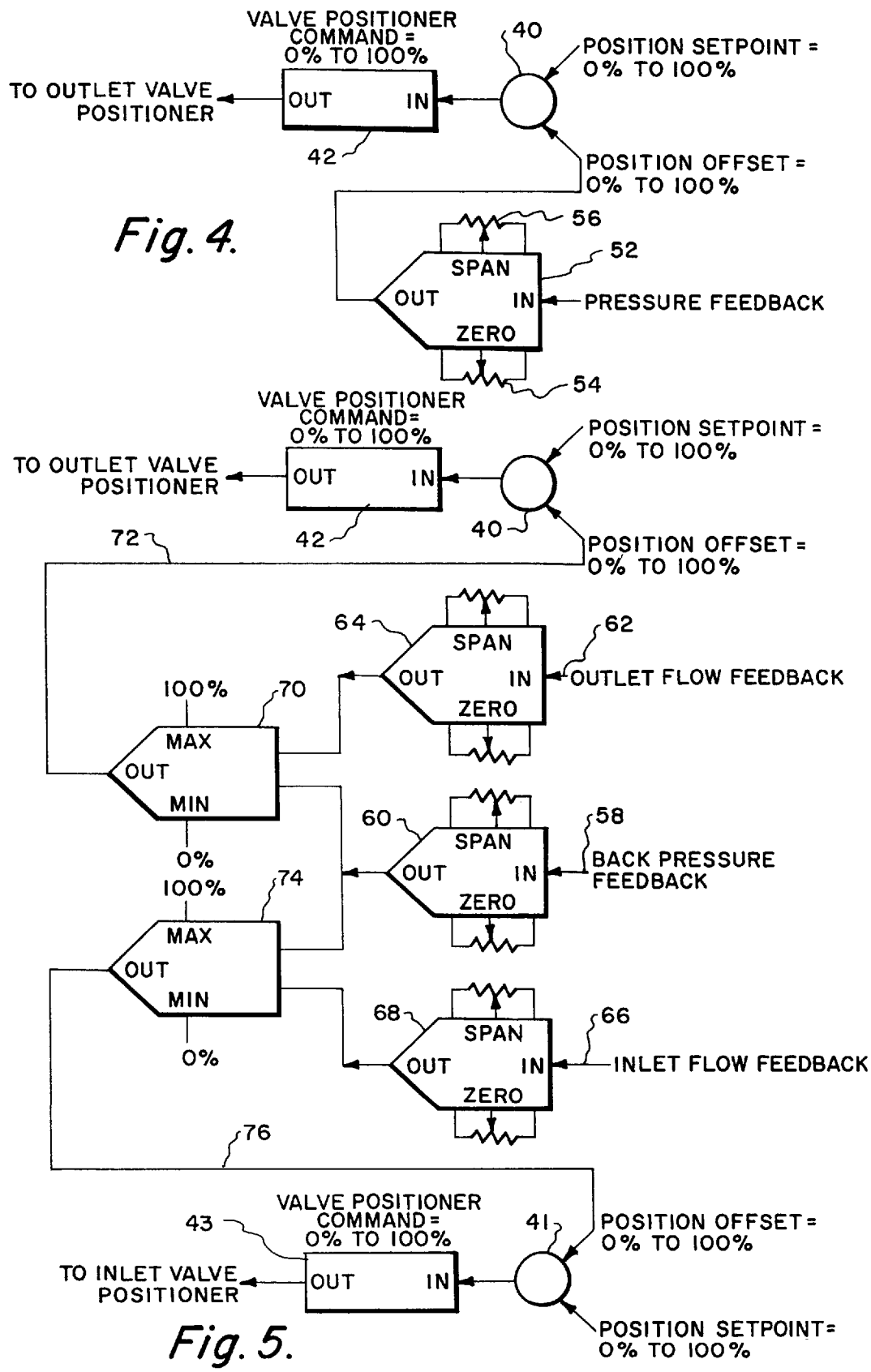
FIG. 4 is a view similar to FIG. 2 but of a second modified form which utilizes the back pressure of the dynamometer to vary the position of the valve.
FIG. 5 is a schematic view depicting utilizing the inlet flow rate, the outlet flow rate and the back pressure of the dynamometer to control controllers which then are to control the position of both a water inlet valve and a water outlet valve of the dynamometer.

Another technique, which is shown in FIG. 4, would be to regulate the inlet/outlet valve position offset as a function of dynamometer back pressure. Dynamometer back pressure is thought to be directly related to horsepower. A low cost pressure transducer with some simple electronics is only necessary to sum in an offset proportional to outlet pressure. Initially, the dynamometer 10 is operated at near maximum power and the inlet and outlet flow is adjusted by scaling the pressure feedback using span adjustment variable resistor 56 and offset adjustment variable resistor 54 for a desired outlet temperature. Lower absorbed power levels will produce proportionately less back pressure which will produce proportionately less position offset. The assumption here is that the valve position of the butterfly valve plates 28 are linearly proportional to flow. This is true for an equal percentage characteristic valve only if the pressure drop across the valve is constant. Since the pressures at the inlet and outlet of the dynamometer 10 vary with speed and load, simply varying the inlet/outlet valve position offset lineally with outlet valve back pressure will not result in a relatively constant outlet temperature. Depending on the inlet/outlet pressure changes with speed and load, the resulting flow could be relatively high or low at any point except maximum power. The back pressure is supplied through an amplifier 52. The offset of the amplifier 52 is preset by variable resistor 54 with the gain of the amplifier 52 being preset by the variable resistor 56.

Referring particularly to FIG. 5, precise control of outlet temperature within the water outlet flow pipe 20 can be obtained using the outlet back pressure feedback signal 58 as the horsepower setpoint which is transmitted by amplifier 60. The outlet flow signal 62 is transmitted by amplifier 64. The inlet flow signal 66 is transmitted by amplifier 68. The output of amplifier 64 is transmitted to a controller 70. Also transmitted to the controller 70 is the output of amplifier 60. The output of controller 70 produces the precision offset signal 72 which in turn works through the summing junction 40 and limiter 42 to control the outlet valve positioner 36. This outlet valve positioner 36 would be located in conjunction with the water inlet valve 24.

The outlet signal from the amplifier 68 is transmitted to a controller 74 which also receives the back pressure feedback signal from amplifier 60. The outlet signal 76 from controller 74 is supplied to summing junction 41 which then is supplied through limiter 43 to control the outlet valve positioner 36 that is mounted in conjunction with the outlet valve 26.

Figure 6:
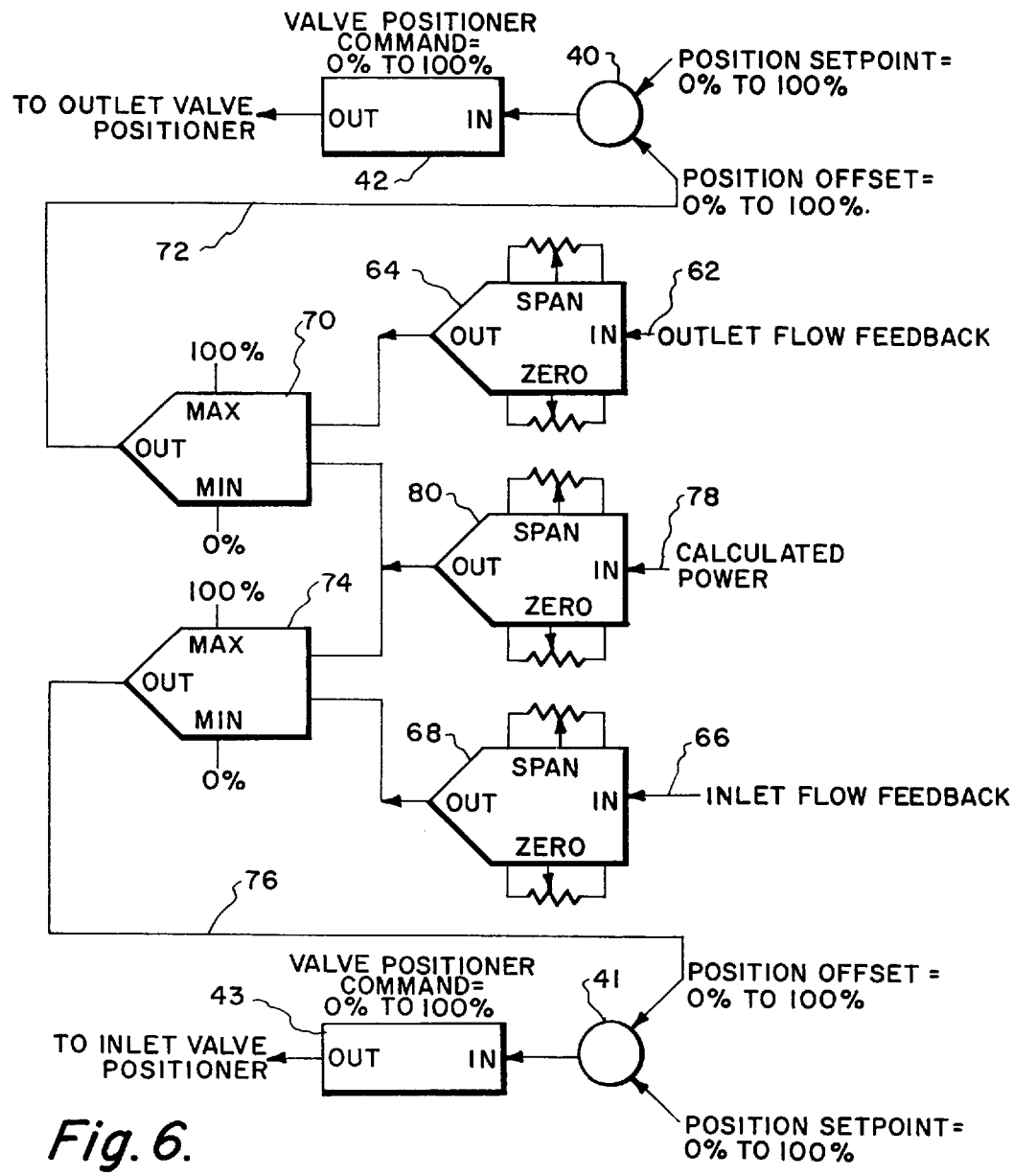
FIG. 6 is a schematic view similar to FIG. 5 but where the calculated power (power that is desired to be obtained) of the dynamometer is utilized to control both the water inlet valve and the water outlet valve of the dynamometer.

Referring particularly to FIG. 6 there is shown a further method which is to directly calculate horsepower and scale the result as an offset valve position. This horsepower can be the desired speed of the dynamometer times the desired torque divided by a constant which would comprise setpoint power. The feedback power could be determined by the actual output rpm of the dynamometer times the actual output torque of the dynamometer divided by a constant. This horsepower signal 78, either setpoint of feedback, is supplied into an amplifier 80. The output of amplifier 80 is transmitted to both controllers 70 and 74. Controller 70 works to operate the positioner 36 of the water inlet valve 24 while the controller 74 operates the positioner 36 of the water outlet valve 26.

Figure 7:
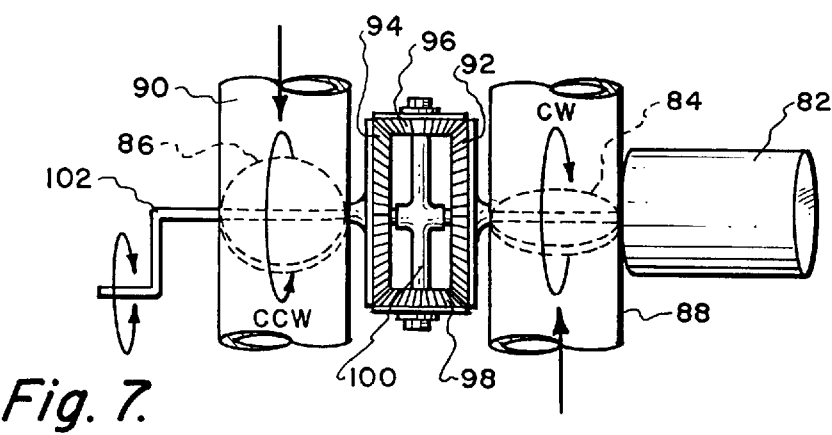
FIG. 7 schematically depicts a mechanical method as opposed to an electronic method of adjusting the position setpoint and the position offset of the dynamometer controller of the present invention.

The above methods of adjusting the inlet/outlet offset to affect flow regulation can also be done mechanically instead of electronically. For example, referring to FIG. 7, a single drive motor in the form of valve positioner 82 can be used to drive both the butterfly valve plates 84 and 86 of the respective outlet valves within outlet pipe 88 and inlet pipe 90. Between the butterfly valve plates 84 and 86 there is mounted a differential composed of bevel gears 92 and 94 and bevel gears 96 and 98. Supporting the bevel gears 96 and 98 is a pinion gear arm 100. This pinion gear arm 100 can be separately turned either manually by a crank 102 or by a motor not shown.

The valve positioner 82 turns the butterfly valve plate 84 clockwise. The bevel gear 92, which is fixed to the butterfly valve plate 84, is also turned clockwise an equal number of degrees. This rotates the pinion gears 96 and 98 which causes the bevel gear 94 to pivot the same number of degrees but in the opposite direction. Since the bevel gear 94 is fixed to the butterfly valve plate 86, this butterfly valve plate 86 is pivoted counterclockwise the same number of degrees the butterfly valve plate 84 was pivoted clockwise. Turning of the crank 102 turns the pinion gear arm 100 which causes a differential output to rotationally follow the direction of the pinion gear arm 100. Thus turning of the crank 102 causes the inlet/outlet rotational offset of the butterfly valve plates 84 and 86 to be adjusted.

The selection of which of the previous arrangements will be used depends on the specific dynamometer and the application requirements of that dynamometer. The water inlet valve opens and the water outlet valve simultaneously closes at the same dynamic rate to increase the level of water inside the dynamometer and thus increase load and vice versa to decrease the level of water inside the dynamometer and thus decrease load. The water inlet valve and the water outlet valve both simultaneously open at the same dynamic rate to increase flow and vice versa to decrease flow thus controlling outlet water temperature. The technique of this invention does not need any type of regulator valve ahead of the water inlet valve 24 to control the temperature and thus it has the full capacity of the water supply at the water inlet pipe 16 for rapid load changes and yet uses only the minimum water required for a given outlet temperature.

It is believed that dynamically varying both simultaneously the inlet and outlet flow of the dynamometer is novel to control dynamometer load and water temperature. Previously known outlet temperature control methods have relied on measuring outlet water temperature or pressure to control input flow, or to vary the inlet pressure or restrict the inlet flow to control outlet temperature. The problem with such prior art control techniques is that such reduce the available water supply for rapid load changes. Typically what happens is the outlet temperature is too low, so the inlet pressure is reduced, in other words, the inlet flow is reduced, in other words, the inlet flow is restricted. Then if a rapid load increase is desired, there is insufficient flow available to fill the dynamometer rapidly and fast control is not possible. In accordance with this invention, by changing the offset between the inlet and outlet valve positions so as to increase or decrease flow, outlet temperature control is achieved without restricting the inlet flow availability and a much faster control results.

Figure 8:
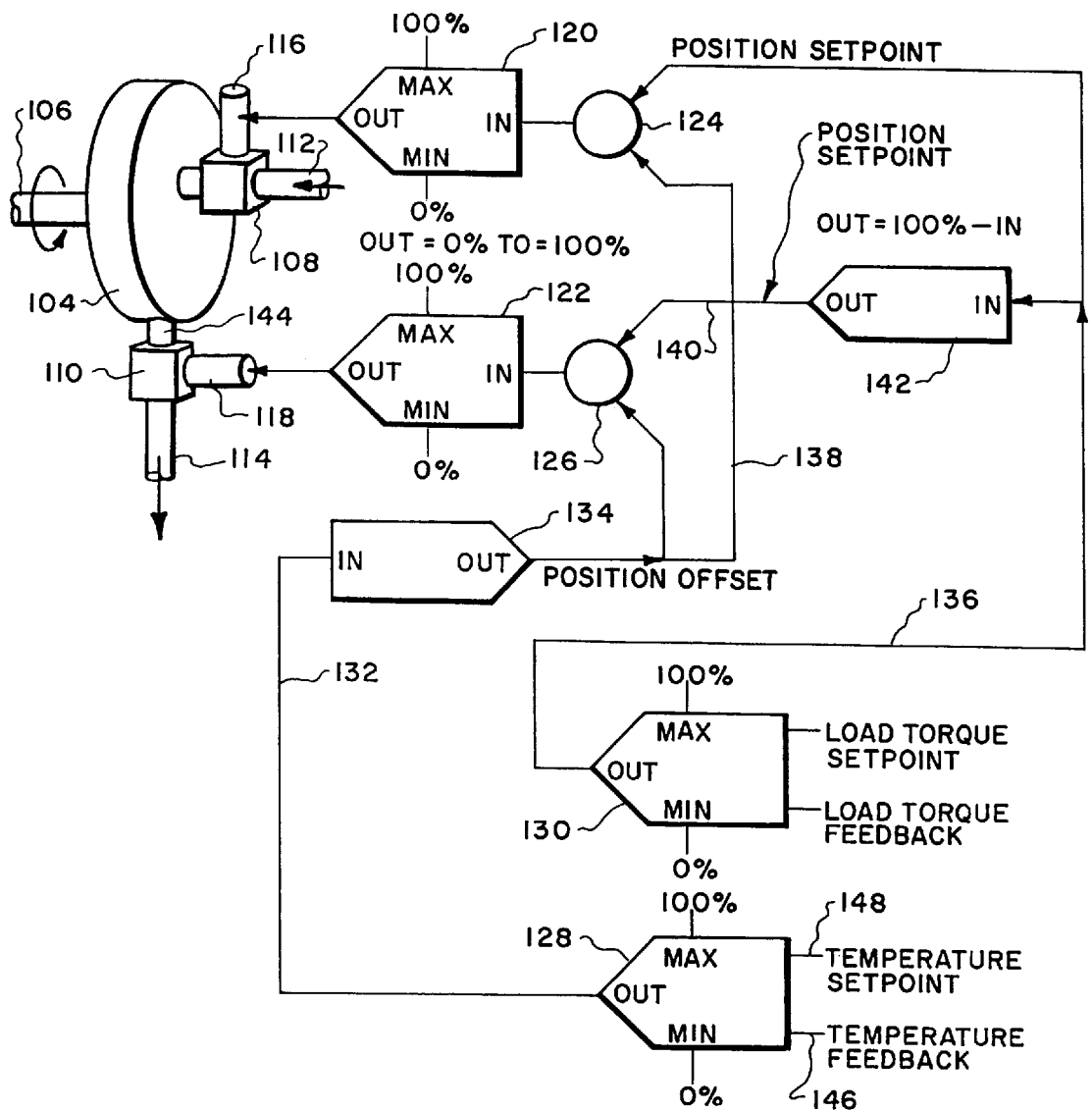
FIG. 8 is a schematic view representing a typical implementation of combined load torque and temperature control for water brake dynamometers using fast acting valves on the water inlet and water outlet of the dynamometer.

Referring particularly to FIG. 8 there is shown the typical implementation of a combined load torque and temperature control for a water brake dynamometer 104. The load (not shown) is to be connected to the water brake dynamometer drive shaft 106. Connecting with the dynamometer 104 is a water inlet valve 108 and a water outlet valve 110. Water is to be supplied through water inlet pipe 112, through water inlet valve 108 to the water brake dynamometer 104. From the water brake dynamometer 104 the water is to flow through the water outlet valve 110 and through the water outlet pipe 114. The position of the water inlet valve 108 is controlled by means of an electrical motor in the form of an inlet valve positioner 116. The position of the water outlet valve 110 is controlled by means of an electrical motor in the form of an outlet valve positioner 118.

Connecting with inlet valve positioner 116 is a limiter 120. A similar limiter 122 connects with the outlet valve positioner 118. Feeding into the limiter 120 is a summing junction 124. A similar summing junction 126 feeds into limiter 122. There is a controller 128 for the outlet water temperature and controller 130 for the load torque. Temperature control output 132 from the controller 128 is inverted by invertor 134 with the output 138 of the invertor 134 being added to the output of controller 130 within summing junction 124. The position of the inlet valve positioner 116 is located somewhere between 0% and 100%. The inverted output 138 of the temperature controller 128 is also summed by summing junction 126 along with the output 140 of invertor 142 which receives output 136 from the load torque controller 130. The purpose of inverting the output of the temperature controller 128 and load torque controller 130 is so that the water flow will decrease in order to increase water temperature which will simultaneously open the inlet valve positioner 116 and close the water outlet valve 110 to increase load torque (vice versa to decrease load torque) and also simultaneously open both water inlet valve positioner 116 and water outlet valve 110 to decrease outlet water temperature (vice versa to increase outlet water temperature).

FIG. 8 also shows a typical outlet water temperature probe 144 installed within the water outlet flow pipe 114 of the dynamometer 104. The purpose of this outlet water temperature probe 144 is for outlet water temperature feedback. This feedback is transmitted by a signal 146 into temperature controller 128. The temperature setpoint signal 148 of controller 126 constitutes initially established temperature limits. A dynamometer outlet pressure sensor (not shown) would be mounted in a similar location. Other typical dynamometer sensors such as dynamometer torque (load cell or shaft torque sensor) and dynamometer speed (rpm) are not shown in the drawings because all (including the outlet water temperature probe and the dynamometer outlet pressure probe) employ well known prior art.

The previously described embodiments show a linear valve position offset being added to the position setpoint in order to achieve flow control and therefore temperature control of the dynamometer outlet water temperature. The disadvantage of a linear offset being added to a linear position setpoint is that the offset limits the range of valve position that the valve positioner is capable of achieving. The position offset and the position setpoint are summed, but the minimum sum cannot be less than 0% and the maximum sum cannot be more than 100%, and furthermore, neither the position offset nor the position setpoint can exceed 100%. For example, if the offset is positive (10% more flow), then the minimum valve position will be 10% even if the position setpoint is zero. If the offset is negative (10% less flow), then the maximum valve position will be 90% because the position setpoint cannot exceed 100%.

Figure 9:
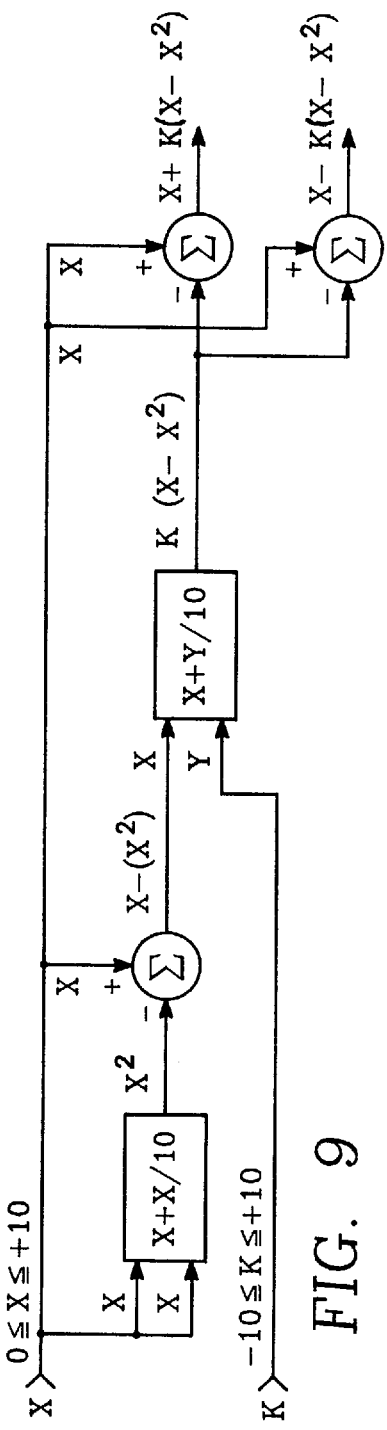
FIG. 9 is a summation representation of a non-linear offset with the position setpoint of the water brake dynamometer of the invention.

It is possible to embody a non-linear offset which is summed with the position setpoint as previously described such that the full range of valve positioners is not affected, but the non-linear offset still adjusts the steady state flow and thus the outlet water temperature of the dynamometer. Such as embodiment is shown in FIG. 9. This embodiment also has the advantage of not requiring the previously required precision limiters since the 0% to 100% range of the load control signal from the load controller (the position setpoint) is not affected. The same item numbers from FIG. 8 will be used to describe this embodiment.

The output of load controller 130 connects to the X input 150 of FIG. 9. X regulates fill and thus load. Note that the output of the load controller is assumed limited to a 0% to 100% (e.g. 0 to 10 Volts) range. The output of the temperature controller 128 connects to the K input 152 of FIG. 9. K regulates flow and thus temperature. Note that the output of the temperature controller is assumed to be able to range from −100% to +100% (e.g. −10 Volts to +10 Volts). The inlet valve position setpoint $X+K(X-X^2)$ connects to inlet valve positioner 116. The inlet valve position setpoint increasing value opens valve. The outlet position setpoint $X-K(X-X^2)$ connects to outlet valve positioner 118. Outlet valve position setpoint increasing value closes valve. Note that outlet valve positioner 118 is set up so that 0% position corresponds to fully open and 100% position corresponds to fully closed (this is opposite to how the outlet valve positioner in previous examples was set up).

The principle of operation with this embodiment is that the dynamometer acts as an accumulator (i.e. has volumetric capacity) and the level of water inside is proportional to the difference between the inlet flow and the outlet flow times the time this flow difference exists. When the dynamometer is at a steady load the water level must be constant and therefore, the inlet flow must equal the outlet flow.

So, if we assume the inlet and outlet pressure differentials across the inlet and outlet valves are the same, then both the inlet and outlet valves will be at 50% position for steady state load conditions. In practice the inlet and outlet pressure differentials will not be exactly equal so the equilibrium point where inlet and outlet flow are equal will not be exactly 50% position, but the deviation from 50% will typically be small due to the large change in flow for small angular differences in the valve position and the fact that the inlet and outlet positions are changing in opposite directions thus compounding the differential flow differences.

Figure 10:
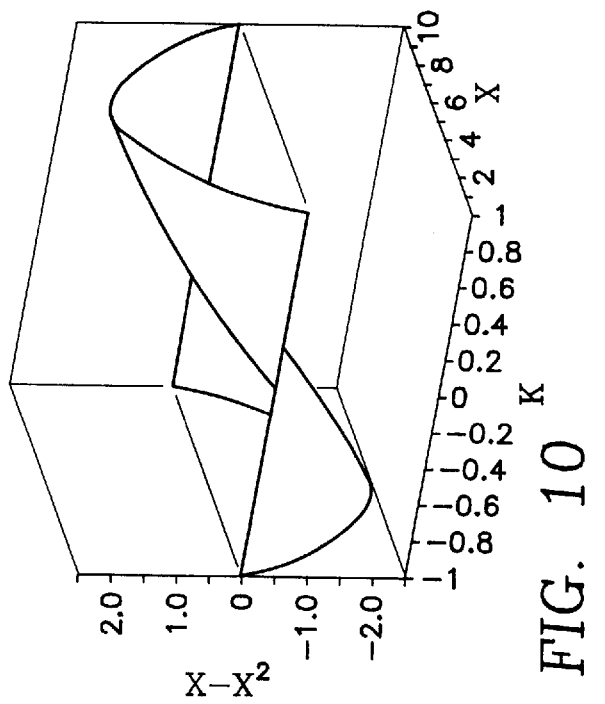
FIG. 10 is a three dimensional graph of the curve produced by values of K to $(X-X^2)$.

The $(X-X^2)$ function produces a curve that has a maximum effect at 50% position and has zero effect at values of X equal to 0 and 1 and thus the offset doesn't have any effect at zero and 100% valve position. The K factor adjusts the amount curvature in the middle of the $(X-X^2)$ curve. This effect is shown in FIG. 10 which shows a plot of $K(X-X^2)$ as a function of K and X for values of K from −1 to +1 and values of X from 0 to 10. Notice that if K is equal to zero there is no curvature and that the curve peaks at ±2.5 for a K of ±1.

Figure 11:
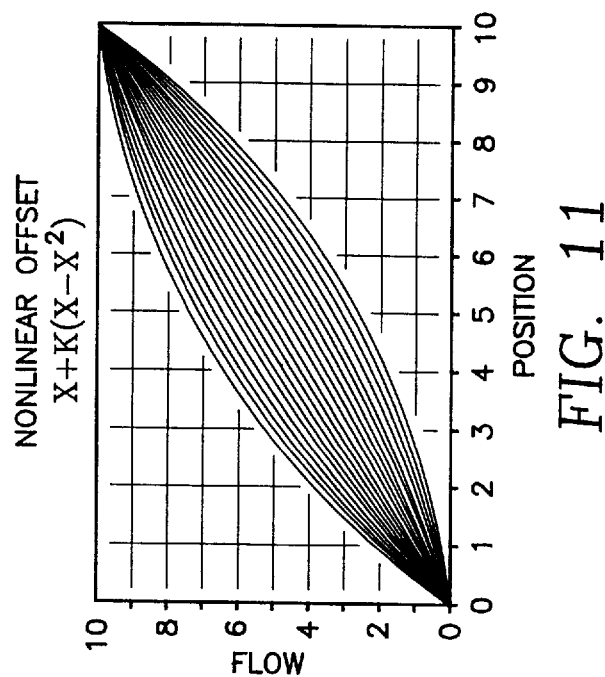
FIG. 11 is a graph of the non-linear offset $X+K(X-X^2)$.

FIG. 11 shows the position setpoint summed with the non-linear offset for values of K from −1 or +1 assuming a linear valve characteristic of flow vs. position showing how the valve characteristic is curved up or down from a straight line as a function of K. Thus adjusting K up or down has the effect of curving the middle of the flow vs. position function for the inlet and outlet valves up or down up to 25% to increase or decrease the equilibrium flow at 50% valve position. The scaling of the $(X-X^2)$ term can be adjusted for a greater or lesser maximum effect than 25%, but experience has shown that this value works well in practice. We have found that if the equilibrium flow needs to be shifted by much more than ±25% in valve position, then the valve is probably sized wrong for the application and a bigger or smaller valve is recommended.

What is claimed is:

1. In combination with a water brake dynamometer having a water inlet and a water outlet, said water brake dynamometer operating at a speed producing a water brake dynamometer torque, a water inlet flow located in said water inlet, a water outlet flow located in said water outlet, said dynamometer being connected to a load, said water inlet having an inlet flow control device, said water outlet having an outlet flow control device, said inlet flow control device being adjustable to set the water inlet flow to any value between a minimum value and a maximum value, said outlet flow control device being adjustable to set the water outlet flow to any value between a minimum value and a maximum value, the improvement comprising:

said inlet flow control device is separate and independently controllable from said outflow control device, a controller connected to both said inlet flow control device and said outlet flow control device, said controller to cause independent adjustment of said inlet flow control device and said outlet flow control device, said controller to cause simultaneous changes from a pre-established level of flow within both said water inlet and said water outlet; and said changes including increasing the flow within said water inlet while decreasing the flow within said water outlet, the amount that said flow is increased within said water inlet being equal to the amount that said flow is decreased within said water outlet in order to increase the amount of water inside said water brake dynamometer and therefore rapidly increase the load torque absorbed by said water brake dynamometer.

2. In combination with a water brake dynamometer having a water inlet and a water outlet, said water brake dynamometer operating at a speed producing a water brake dynamometer torque, a water inlet flow located in said water inlet, a water outlet flow located in said water outlet, said dynamometer being connected to a load, said water inlet having an inlet flow control device, said water outlet having an outlet flow control device, said inlet flow control device being adjustable to set the water inlet flow to any value between a minimum value and a maximum value, said outlet flow control device being adjustable to set the water outlet flow to any value between a minimum value and a maximum value, the improvement comprising:

said inlet flow control device is separate and independently controllable from said outflow control device, a controller connected to both said inlet flow control device and said outlet flow control device, said controller to cause independent adjustment of said inlet flow control device and said outlet flow control device, said controller to cause simultaneous changes from a pre-established level of flow within both said water inlet and said water outlet; and said changes including increasing the flow within said water outlet while decreasing the flow within said water inlet in order to rapidly decrease the amount of water inside said water brake dynamometer and therefore rapidly decrease the load torque absorbed by said water brake dynamometer, the amount that said flow is increased within said water outlet being equal to the amount that said flow is decreased within said water inlet in order to rapidly decrease the amount of water inside said water brake dynamometer and therefore rapidly decrease the load torque absorbed by said water brake dynamometer.

3. In combination with a water brake dynamometer having a water inlet and a water outlet, said water brake dynamometer operating at a speed producing a water brake dynamometer torque, a water inlet flow located in said water inlet, a water outlet flow located in said water outlet, said dynamometer being connected to a load, said water inlet having an inlet flow control device, said water outlet having an outlet flow control device, said inlet flow control device being adjustable to set the water inlet flow to any value between a minimum value and a maximum value, said outlet flow control device being adjustable to set the water outlet flow to any value between a minimum value and a maximum value, the improvement comprising:

a controller connected to both said inlet flow control device and said outlet flow control device, said controller to cause adjustment of said inlet flow control device and said outlet flow control device, said controller to cause simultaneous changes from a pre-established level of flow within both said water inlet and said water outlet; and said water outlet flow and said water inlet flow is decreased in order to increase the temperature of said water outlet flow.

4. In combination with a water brake dynamometer having a water inlet and a water outlet, said water brake dynamometer operating at a speed producing a water brake dynamometer torque, a water inlet flow located in said water inlet, a water outlet flow located in said water outlet, said dynamometer being connected to a load, said water inlet having an inlet flow control device, said water outlet having an outlet flow control device, said inlet flow control device being adjustable to set the water inlet flow to any value between a minimum value and a maximum value, said outlet flow control device being adjustable to set the water outlet flow to any value between a minimum value and a maximum value, the improvement comprising:

a controller connected to both said inlet flow control device and said outlet flow control device, said controller to cause adjustment of said inlet flow control device and said outlet flow control device, said controller to cause simultaneous changes from a pre-established level of flow within both said water inlet and said water outlet; and said water outlet flow and said water inlet flow is increased in order to decrease the temperature of said water outlet flow.

5. In combination with a water brake dynamometer having a water inlet and a water outlet, said water brake dynamometer operating at a speed producing a water brake dynamometer torque, a water inlet flow located in said water inlet, a water outlet flow located in said water outlet, said dynamometer being connected to a load, said water inlet having an inlet flow control device, said water outlet having an outlet flow control device, said inlet flow control device being adjustable to set the water inlet flow to any value between a minimum value and a maximum value, said outlet flow control device being adjustable to set the water outlet flow to any value between a minimum value and a maximum value, the improvement comprising:

a controller connected to both said inlet flow control device and said outlet flow control device, said controller to cause adjustment of said inlet flow control device and said outlet flow control device, said controller to cause simultaneous changes from a pre-established level of flow within both said water inlet and said water outlet; and said water inlet flow being connected to said water supply through an inlet valve means, said water outlet being connected to said water supply through an outlet valve means, the improvement comprising:

said inlet valve means and said outlet valve means being movable by a controller to establish a flow of water through said water inlet and said water outlet, said inlet valve means and said outlet valve means being setable to select a level of flow between a minimum level and a maximum level, said level of flow being determined by a position setpoint and a position offset, said position setpoint defines the pre-established amount said inlet valve means and said outlet valve means is to be opened respectively within said water inlet and said water outlet, when said position setpoint is set at 100% said inlet valve means and said outlet valve means being totally open, when said position offset is set at 0% said inlet valve means and said outlet valve means being totally closed, said position offset defines the minimal amount said inlet valve means and said outlet valve means is to be open, the actual open position of said inlet valve means and said outlet valve means being determined by the adding said pre-established amount and said minimal amount.

6. The combination as defined in claim 5 wherein:

said position offset of said inlet valve being varied according to water temperature in said water outlet to affect rapid control of said water temperature in said water outlet.

7. The combination as defined in claim 6 wherein:

said position offset of said inlet valve also being varied according to water pressure in said water outlet to affect rapid control of said water temperature in said water outlet.

8. The combination as defined in claim 5 wherein:

said position offset of said outlet valve being varied according to water temperature in said water outlet to affect rapid control of said water temperature in said water outlet.

9. The combination as defined in claim 8 wherein:

said position offset of said outlet valve also being varied according to water pressure in said water outlet to affect rapid control of said water temperature in said water outlet.

10. The combination as defined in claim 5 wherein:

said position offset of said inlet valve and said position offset of said outlet valve being simultaneously varied according to water temperature in said water outlet to affect rapid control of said water temperature in said water outlet.

11. The combination as defined in claim 10 wherein:

said position offset of said inlet valve and said position offset of said outlet valve also being simultaneously varied according to water pressure in said water outlet to affect rapid control of said water temperature in said water outlet.

12. The combination as defined in claim 5 wherein:

said position offset of said inlet valve and said position offset of said outlet valve being simultaneously varied by equal amounts according to water temperature in said water outlet to affect rapid control of said water temperature in said water outlet.

13. The combination as defined in claim 12 wherein:

said position offset of said inlet valve and said position offset of said outlet valve also being simultaneously varied by equal amounted according to water pressure in said water outlet to affect rapid control of said water temperature in said water outlet.

14. The combination as defined in claim 5 wherein:

said position offset of said inlet valve being varied according to desired power that is to be absorbed by the water within said dynamometer to affect rapid control of said water temperature in said water outlet.

15. The combination as defined in claim 5 wherein:

said position offset of said outlet valve being varied according to desired power that is to be absorbed by the water within said dynamometer to affect rapid control of said water temperature in said water outlet.

16. The combination as defined in claim 5 wherein:

said position offset of said inlet valve and said position offset of said outlet valve being simultaneously varied according to desired power that is to be absorbed by the water within said dynamometer to affect rapid control of said water temperature in said water outlet.

17. The combination as defined in claim 5 wherein:

said position offset of said inlet valve and said position offset of said outlet valve being simultaneously varied in equal amounts according to desired power that is to be absorbed by the water within said dynamometer to affect rapid control of said water temperature in said water outlet.

18. The combination as defined in claim 5 wherein:

said position offset of said inlet valve being varied according to actual power that is to be absorbed by the water within said dynamometer to affect rapid control of said water temperature in said water outlet.

19. The combination as defined in claim 5 wherein:

said position offset of said outlet valve being varied according to actual power that is to be absorbed by the water within said dynamometer to affect rapid control of said water temperature in said water outlet.

20. The combination as defined in claim 5 wherein:

said position offset of said inlet valve and said position offset of said outlet valve being simultaneously varied according to actual power that is to be absorbed by the water within said dynamometer to affect rapid control of said water temperature in said water outlet.

21. The combination as defined in claim 5 wherein:

said position offset of said inlet valve and said position offset of said outlet valve being simultaneously varied in equal amounts according to actual power that is to be absorbed by the water within said dynamometer to affect rapid control of said water temperature in said water outlet.

22. The combination as defined in claim 5 wherein:

said position setpoint being varied in order to establish a desired torque to be absorbed by said dynamometer.

23. The combination as defined in claim 5 wherein:

said position setpoint being varied in order to establish a desired speed of said dynamometer.

24. The combination as defined in claim 5 wherein:

said position offset is an adjustable non-linear function of said position setpoint.

25. The combination as defined in claim 5 wherein:

said position offset is the non-linear function $K(X-X^2)$ where X is the position setpoint adjustment and K is the position offset adjustment.

* * * * *